United States Patent
Gluck et al.

(10) Patent No.: US 9,170,908 B2
(45) Date of Patent: Oct. 27, 2015

(54) SYSTEM AND METHOD FOR DYNAMIC ANALYSIS BYTECODE INJECTION FOR APPLICATION DATAFLOW

(71) Applicant: salesforce.com, inc., San Francisco, CA (US)

(72) Inventors: Yoel Gluck, San Francisco, CA (US); Xiaoran Wang, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 43 days.

(21) Appl. No.: 14/067,294

(22) Filed: Oct. 30, 2013

(65) Prior Publication Data
US 2014/0173571 A1    Jun. 19, 2014

Related U.S. Application Data

(60) Provisional application No. 61/737,613, filed on Dec. 14, 2012.

(51) Int. Cl.
 *G06F 11/36* (2006.01)
 *G06F 11/30* (2006.01)
 *G06F 21/00* (2013.01)

(52) U.S. Cl.
 CPC ............ *G06F 11/30* (2013.01); *G06F 11/3636* (2013.01); *G06F 11/3644* (2013.01); *G06F 21/00* (2013.01)

(58) Field of Classification Search
 USPC ......................................................... 717/130
 See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

OTHER PUBLICATIONS

U.S. Appl. No. 13/998,890.

(Continued)

*Primary Examiner* — John Chavis
(74) *Attorney, Agent, or Firm* — Dergosits & Noah LLP; Todd A. Noah

(57) ABSTRACT

Bytecode is injected to create a source tracking object for a data object received from a data source and to record information associated with the data source into the source tracking object. Bytecode is injected to create a copy of the data object for a tracking event in an application program, to create a flow tracking object for the tracking event, and to record information associated with the tracking event into the flow tracking object as the tracking event processes the copy of the data object. Bytecode is injected to create a sink tracking object for outputting the copy of the data object to a data sink and to record information associated with the data sink into the sink tracking object. Bytecode is injected to output the source tracking object, the flow tracking object, and the sink tracking object as dynamic analysis of dataflow in the application program.

20 Claims, 4 Drawing Sheets

(56) References Cited

U.S. PATENT DOCUMENTS

| | | | |
|---|---|---|---|
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,698,160 B2 | 4/2010 | Beaven et al. | |
| 7,779,475 B2 | 8/2010 | Jakobson et al. | |
| 7,809,761 B2 | 10/2010 | Ferguson | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0112037 A1* | 5/2006 | Chagoly et al. | 706/20 |
| 2007/0016949 A1 | 1/2007 | Dunagan et al. | |
| 2009/0063415 A1 | 3/2009 | Chatfield et al. | |
| 2009/0064114 A1* | 3/2009 | Bottomley et al. | 717/148 |
| 2009/0100342 A1 | 4/2009 | Jakobson | |
| 2009/0177764 A1 | 7/2009 | Marlow et al. | |
| 2011/0321016 A1* | 12/2011 | Haviv et al. | 717/128 |
| 2012/0102029 A1 | 4/2012 | Larson et al. | |
| 2012/0233137 A1 | 9/2012 | Jakobson et al. | |
| 2013/0086424 A1* | 4/2013 | Smiljanic et al. | 714/32 |
| 2013/0160131 A1* | 6/2013 | Madou et al. | 726/25 |
| 2013/0218948 A1 | 8/2013 | Jakobson | |
| 2013/0218949 A1 | 8/2013 | Jakobson | |
| 2013/0218966 A1 | 8/2013 | Jakobson | |
| 2014/0137084 A1 | 5/2014 | Tripp | |

OTHER PUBLICATIONS

U.S. Appl. No. 13/987,075.
U.S. Appl. No. 13/987,074.
U.S. Appl. No. 13/998,065.
U.S. Appl. No. 13/986,744.
U.S. Appl. No. 13/986,251.

* cited by examiner

SYSTEM AND METHOD FOR DYNAMIC ANALYSIS BYTECODE INJECTION FOR APPLICATION DATAFLOW

CLAIM OF PRIORITY

This application claims the benefit of U.S. Provisional Patent Application 61/737,613 entitled IMPLEMENT DATAFLOW TRACKING FOR DYNAMIC ANALYSIS BY INSTRUMENTING JAVA BYTE-CODE, by Gluck, et al., filed Dec. 14, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Dynamic Analysis Bytecode Injection for Application Dataflow

One or more implementations relate generally to dynamic analysis bytecode injection for application dataflow.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Vulnerabilities in an application program may be introduced by untrusted data flowing through the application program from an input to an output without the application program performing sufficient actions to prevent potential cyber-security attacks from occurring. For example, an application program may use a uniform resource locator (URL) to receive data that the application program subsequently outputs as data accessed by a web browser, but a web browser displaying a web page based on untrusted data may enable an attacker to gain elevated access-privileges to sensitive web page content. An input for untrusted data is referred to as a taint source, and the output for untrusted data is referred to as a taint sink. Static analysis that tests the security of an application program for vulnerabilities may produce a high rate of false positive results. Dynamic analysis has gained popularity due to the production of fewer false positive results. Therefore, if dynamic analysis identifies a vulnerability in an application program, the vulnerability is more likely to be an actual vulnerability, thereby justifying the expense of sufficient resources in an attempt to analyze the application program's associated dataflow to correct the vulnerability. Dynamic analysis typically identifies application program vulnerabilities such as cross site scripting (XSS) and SQL injection (SQLi).

While dynamic analysis is able to identify application program vulnerabilities by their data sources and data sinks, dynamic analysis does not keep track of the complete flow of data because of problems with recording any information in between the data source and the data sink. Without the information of how data flows in an application program, correcting vulnerabilities is difficult because identifying only a data source and a data sink does not provide any clear indication of the nature of any vulnerabilities between the data source and the data sink. Such difficulties become greater for large application programs, where manually searching source code to review the detailed data flow of possible vulnerabilities is extremely time consuming, and manually identifying the detailed data flow of actual vulnerabilities in the source code is nearly impossible. Additionally, an application program may have multiple possible paths, such as from the same data source to the same data sink. Since dynamic analysis can identify the same vulnerability many times, dynamic analysis typically executes a de-duplication process based on the information describing the vulnerability. Since only the data sources and data sinks are identified, the de-duplication process can mistakenly identify multiple different vulnerabilities that share the same data source and the same data sink as only a single vulnerability. Therefore, identifying all of the actual vulnerabilities becomes more difficult without identifying the specific dataflow between a data source and a data sink. Accordingly, it is desirable to provide techniques that enable a database system to improve the performance, efficiency, and the ease of use of dynamic analysis of dataflow in application programs.

BRIEF SUMMARY

U.S. patent application Ser. No. 14/067,131 filed Oct. 30, 2013, entitled "System and Method for Dynamic Analysis Tracking Objects for Application Dataflow", which is hereby incorporated herein by reference, teaches creating tracking objects and copies of a data object to enable dynamic analysis to track different copies of the same data objects that take different paths in an application program, such as from the same data source to the same data sink.

However, this approach does not work with singleton or mutable data objects due to the lack of a clear way to copy such data objects. Data objects that are connected to a socket cannot be copied because only one data object is allocated to a socket. Some extremely large data objects may require too many system resources to copy. Even when a way exists to copy a complete data object, a database system has to maintain consistency between all of the copied data objects for the application program logic to function correctly. Maintaining such consistency may not be feasible from a resource point of view, because the database system may create hundreds or even thousands of copies of an original data object when an application invokes functions on numerous occasions. Performance degradation may result due to the central processing unit power and memory space required to create and store each copy of the original data object.

U.S. patent application Ser. No. 14/067,205 filed Oct. 30, 2013, entitled "System and Method for Dynamic Analysis Wrapper Objects for Application Dataflow", which is hereby incorporated herein by reference, teaches solving such copying challenges by creating tracking objects and a wrapper object that points to a data object, substituting the wrapper object for each instance when the original data object is referenced, and creating copies of the wrapper object whenever a copy of the original data object would have been required. This copying process works with singleton and mutable data objects because only the wrapper object is copied, as the actual data objects are not copied. The use of multiple wrapper objects pointing to a single data object maintains consistency between all of the wrapper objects and all of the subsequent indirect references to the original data object because there is only a single copy of the original data object. The resources needed to copy and store the wrapper objects are slim as a wrapper object has only two fields, a reference to the actual data object and a tracking object. Only a few bytes are needed to store the wrapper object with the tracking object, and copying is not a resource extensive process anymore.

However, this approach does not work when a first object is assigned as a field of a second object because the information recorded for the second object is not associated with the information recorded for the first object. For example, if the wrapper object for a tainted object is assigned as a field on a previously untainted data object, and the custom object is used to invoke a method, the information for invoking the method is not tied to the tainted object. A system cannot solve this problem by copying the wrapper object for the second object because the first object only affects one field of the second object, not all fields of the second object, whereas the wrapper object points to the object, which includes all fields of the object. Differentiating between fields in the second object would require the system to make copies of the second object itself, instead of making copies of the wrapper object for the second object, but making copies of data objects would reintroduce the aforementioned problems that the substitution of wrapper objects for data objects was used to solve. The consequence is that if the second object is used to invoke any methods and later the first object is retrieved as a field from the second object and passed to a data sink, the information for any method invocations may not be depicted in the application program dataflow.

U.S. patent application Ser. No. 14/067,247 filed Oct. 30, 2013, entitled "System and Method for Dynamic Analysis Tracking Object Associations for Application Dataflow", which is hereby incorporated herein by reference, teaches associating a flow tracking object with another flow tracking object in response to a field retrieval of a copy of a wrapper object from another wrapper object and outputting the associated other flow tracking object as dynamic analysis of dataflow in the application program. For example, the system responds to a field retrieval of the copy of a wrapper object retrieved from the custom object by setting the pointer in the tracking object embedded in the copy of the wrapper object to point to the tracking object embedded in the wrapper object for the custom object, and outputting a sink tracking object as a first node in a graph, the flow tracking object as a second node in the graph, the associated other flow tracking object as a third node in the graph, and the sink tracking object as a fourth node in the graph, with the second node linked to the first node, the third node linked to the second node, and the fourth node linked to the third node to depict the dataflow sequence of the graph. The graph and its associated information depict not only the data source and the data sink, but also depict the dataflow through the application program, which enables the identification of any tracking event as an additional vulnerability.

The dynamic analysis system changes the way that objects are represented in an application program to introduce tracking objects, wrapper objects, and tracking object associations, and to embed dataflow tracking logic into the application program. If the source code of the application program is available, the dynamic analysis system may modify the source code by embedding dataflow tracking logic, and replacing data objects with wrapper objects, but the dynamic analysis system may not have access to the source code of the application program. If the source code of the application program is available, the dynamic analysis system may modify the compiler to produce bytecode that includes dataflow tracking logic and replaces data objects with wrapper objects, but the dynamic analysis system may not have access to the source code of the application program. The dynamic analysis system may modify the interpreter directly so that the bytecode is interpreted in the way that the dynamic analysis system needs, such as replacing data objects with wrapper objects. The dynamic analysis system may also use the interpreter to construct the dataflow directly by intercepting bytecode instructions that may have influence on the dataflow and modify the ways these instructions are interpreted so that the dynamic analysis system can collect the tracking information. Although embedding logic directly in the interpreter is faster than embedding logic in the source code because no interpretation is needed for the embedded logic, modifying the interpreter of one machine is specific to only one platform, as this modification is not cross platform compatible. Therefore, the dynamic analysis system injects bytecode into the application program to include dataflow tracking logic and replace data objects with wrapper objects. If bytecode injection is tweaked in a certain way that enables passing the interpreter checking, bytecode injection is compatible across all platforms interpreted by the same interpreter, and does not require the often unavailable source code.

Embodiments provide dynamic analysis bytecode injection for application dataflow. Bytecode is injected to create a source tracking object for a data object received from a data source and to record information associated with the data source into the source tracking object. For example, a system injects bytecode to get a parameter from an untrusted data source, store the parameter as a tainted data object, create a source tracking object for the tainted wrapper object, and record information about whether the tainted data source was reflective or stored, and recording line number 1 in the application program where the tainted data was collected, in the embedded source tracking object. Bytecode is injected to create a copy of the data object for a tracking event in an application program, to create a flow tracking object for the tracking event, and to record information associated with the tracking event into the flow tracking object as the tracking event processes the copy of the data object. For example, the system injects bytecode to create a copy of a tainted wrapper object for assignment of the tainted wrapper object as a field of a custom object, create a flow tracking object for assigning the copy of the tainted wrapper object to the field of a custom object, and record information about the field assignment of the tainted wrapper object, and the line number 3 in the application program where the field was assigned to the previously untainted custom object, into the embedded flow tracking object. Bytecode is injected to create a sink tracking object for outputting the copy of the data object to a data sink and to record information associated with the data sink into the sink tracking object. For example, the system injects bytecode to respond to the execution of a field retrieval of the copy of the tainted wrapper object from the previously untainted data object and the printing of the copy of the tainted wrapper object by creating a sink tracking object for the printing of the copy of the tainted wrapper object, and recording information about the data sink, and the line number 5 in the application program where the printing occurred, into the sink tracking object. Bytecode is injected to output the source tracking object, the flow tracking object, and the sink tracking object as dynamic analysis of dataflow in the application program. For example, the system injects bytecode to output the source tracking object as a first node in a graph, the first flow tracking object as a second node in the graph, the associated second flow tracking object as a third node in the graph, and the sink tracking object as a fourth node in the graph, with the second node linked to the first node, the third node linked to the second node, and the fourth node linked to the third node to depict the dataflow sequence of the graph. By associating the second flow tracking object, which recorded information for the custom object, with the first flow tracking object, which recorded information for the object, the injected bytecode concatenates previously unrelated information to create a complete dataflow for the data. The graph and its associated information depict not only the data source and the data sink, but also depict the dataflow through the application program, which enables the identification of any tracking event as an additional vulnerability. Accordingly, systems and methods are provided which enable a database system to improve the performance, efficiency, and the ease of use of dynamic analysis of dataflow in application programs.

While one or more implementations and techniques are described with reference to an embodiment in which dynamic analysis bytecode injection for application dataflow is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for dynamic analysis bytecode injection for application dataflow.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for dynamic analysis bytecode injection for application dataflow will be described with reference to example embodiments.

The following detailed description will first describe a method for dynamic analysis bytecode injection for application dataflow.

Next, a block diagram of a portion of example application code and its associated dataflow graph for dynamic analysis bytecode injection for application dataflow is described.

Figure 1:
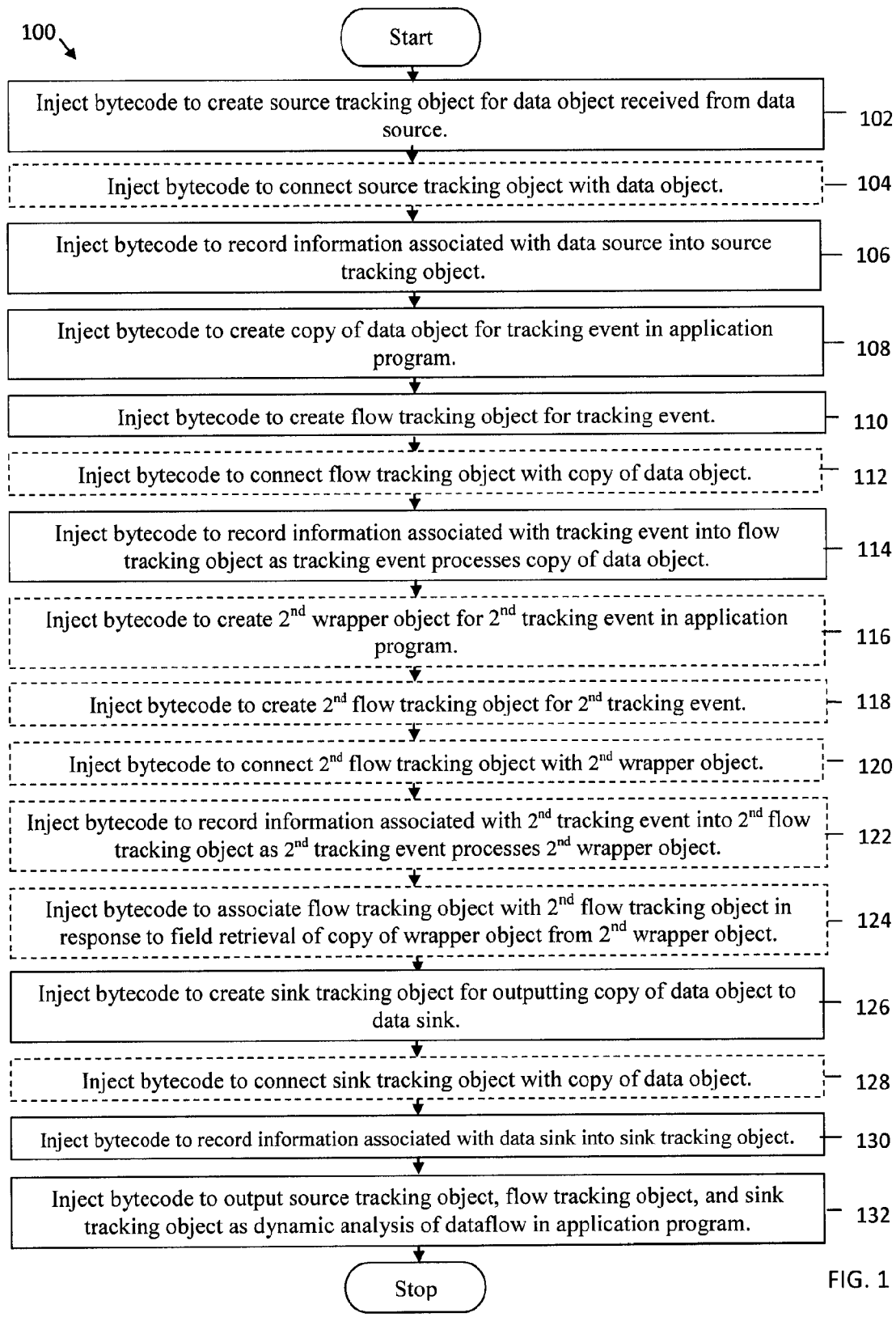
FIG. 1 is an operational flow diagram illustrating a high level overview of a method for dynamic analysis bytecode injection for application dataflow in an embodiment.

FIG. 1 is an operational flow diagram illustrating a high level overview of a method 100 for dynamic analysis bytecode injection for application dataflow. As shown in FIG. 1, a database system can provide dynamic analysis of dataflow in application programs.

In block 102, bytecode is injected to create a source tracking object for a data object received from data source. For example and without limitation, this can include the database system injecting bytecode to get a parameter from an untrusted data source, store the parameter as a tainted data object, and create a source tracking object for the tainted data object. Although this example describes the application dataflow beginning with a tainted data source, the application dataflow may begin with any point of interest in the code, whether tainted or untainted. A data source can be arbitrary defined as a point in the code based on whatever logic is required. The database system may inject bytecode to create a wrapper object that points to the data object and replace the data object with the wrapper object in the bytecode. The database system may inject bytecode to change references to the data object to references to the wrapper object instead, because the wrapper object will become the new data object with reference to the original data object and information. Below is an example pseudo code that represents the bytecode that may be injected for a data structure of a wrapper object.

```
public class Wrapper{
    private Object element
    private Node node;
}
```

A tracking object may be referred to as a node object, as the tracking object may be subsequently represented by a node in a dataflow graph. Below is an example pseudo code that may be injected as bytecode for a data structure of a tracking object, which may be for a source tracking object, a flow tracking object, or a sink tracking object.

```
Public class Node {
    private Node parents[ ];
    private int datapoint;
    private int taint_info;
    private Node potential;
}
```

The parents array attribute points to the parent nodes for the current node. The datapoint attribute stores location identifiers about where tracking information associated with data is collected. Example location identifiers include filenames, line numbers, etc. However, instead of storing a string to represent a location identifier, the database system may inject bytecode to create a hashmap with an integer as the key and a string as the value, and inject bytecode to subsequently lookup the hashmap for the actual location of the location identifier, thereby conserving database system resources. The taint_info attribute stores taint information related to the location associated with the tainted data, such as whether it is a data source, a data sink, a sanitization point, etc. A sanitization point is a location in an application program designed to replace potentially dangerous data with non-dangerous data, such as replacing hyper-text markup language (HTML) control characters. In order to efficiently concatenate the information carried by a tracking object for a first object and the tracking object for a second object that now includes the first object as a field, the database system does not have to copy the information from the tracking object for the second object to the tracking object for the first object. Instead the database system injects bytecode to set the "potential" pointer of the tracking object, or node, of the first object to point to the current tracking object, or node, of the second object. When the first object reaches a data sink, the injected bytecode may use the "potential" pointer for the first object's node to retrieve the information from the second object's node(s), and concatenate the retrieved information with the information from the first object's node(s) to create a combined dataflow through the application program.

In block 104, bytecode is optionally injected to connect a source tracking object with a data object. By way of example and without limitation, this includes the database system injecting bytecode to embed a source tracking object in a tainted wrapper object, thereby enabling the tracking of tainted data and the associated dataflow as the tainted wrapper object flows through the application program. Such a connection allows the injected bytecode to easily tie the tracking objects and their data flows together without having to create a separate out-of-band mechanism to do this. Additionally, as described below in reference to block 124, embedding a tracking object in a wrapper object leverages the garbage collector, such that when a wrapper object and its tracking object are subsequently deleted, garbage collector removes the tracking object's associated data flow information as well, leaving the dataflow information for the tracking objects that are not deleted to represent the application dataflow.

In block 106, bytecode is injected to record information associated with a data source into a source tracking object. In embodiments this can include the database system injecting bytecode to record information about whether the tainted data source was reflective or stored, and record line number 1 in the application program where the tainted data was collected, in the embedded source tracking object. The database system may inject bytecode to keep track of the context of the vulnerability, such as the nature of the potential vulnerability (based on the location/type of taint), whether a tainted wrapper object has been validated or sanitized, and what kind of validation, if any, has been done on the tainted wrapper object. Validation of a wrapper object is a verification that the wrapper object does not include tainted data. The database system may also inject bytecode to keep track of the confidence level of the vulnerability, such as how confident the injected bytecode is to classify a dataflow into a specific level of vulnerability. For example, an application program may access taint sources by reading various external files, with some of the files more trusted than the other files. Including a confidence level can help in defining how likely an identified dataflow is a real vulnerability. The database system may also inject bytecode to include the capability of tracking method invocation on both the caller and the callee sides, which may help a system user to better understand the connection between the wrapper object used when calling the method and the wrapper object used within the called method. The database system may inject bytecode to record the callee information at the reporting time, and not as the process normally flows. When reporting information after a data sink is reached, the injected bytecode can report two data points per function call, at the caller side and at the callee side.

In block 108, bytecode is injected to create a copy of a data object for a tracking event in an application program. For example and without limitation, this can include the database system injecting bytecode to create a copy of a tainted wrapper object for assignment of the tainted wrapper object as a field of a custom object. Creating a copy of the wrapper object enables injected bytecode to track different copies of the same wrapper object that take different paths in the application program, such as from the same data source to the same data sink. Creating a copy of the wrapper object is also necessary to prune the dataflow graph to remove irrelevant dataflow information, as discussed below in reference to block 124. Creating a copy of the wrapper object may eliminate false positives and false negatives, because every data flow path is treated independently with its privately copied wrapper objects, such that any changes to the degree of taintedness of the tainted wrapper object in one dataflow path will not be reflected by the degree of taintedness of the tainted wrapper object in another dataflow path.

When copying the wrapper object, the injected bytecode essentially creates a new wrapper object, whose "element" field will be pointing to the same original data object to which the previously created wrapper object points. Later, a new tracking object is created and embedded into the new wrapper object, with the tracking object containing any new information about the data. Copying the wrapper object, which may be referred to as "splitting the wrapper," works with singleton and mutable data objects because the actual data objects are not copied. Only the wrapper object is copied, with different tracking objects assigned to record information. The data object consistency is automatically maintained because there is only a single copy of the data object. The resources needed to copy and store the wrapper objects are slim because a wrapper object has only two fields, a reference to the actual data object and a tracking object. Only a few bytes are needed to store the wrapper object with the tracking object, and copying is not a resource extensive process anymore. An example of pseudo-code that represents injected bytecode for copying a wrapper object is provided below.

```
public static Wrapper split(Wrapper parent) {
    Wrapper child= new Wrapper( );
    child.element = parent.element;
    // Create a new Node and assign fields to it
    child.node = new Node( );
```

-continued

```
child.node.datapoint = hash_lookup(
current_file_name + current_line_no);
child.node.parent.insert(parent.node);
child.node.taint_info =
calc_taint_info(parent.node.taint_info);
return child;
}
```

In block 110, bytecode is injected to create a flow tracking object for a tracking event. By way of example and without limitation, this can include the database system injecting bytecode to create a flow tracking object for assigning a copy of the tainted wrapper object to a field of a custom object. Injecting bytecode to create a tracking object is covered in more detail above in reference to block 102. Injecting bytecode for a tracking event, such as a method invocation, a function call, or an assignment, requires such lengthy and detailed modifications to an application program that these detailed modifications are covered below, after the last block 132 of the method 100 and prior to references to FIG. 2. When the application program assigns an object or a value to an object, the injected bytecode records information about this assignment in the flow tracking object, thereby enabling the injected bytecode to track wrapper objects as they are passed by assignments. As the tracking objects record information for tracking events, the injected bytecode associates the tracking objects together to enable the creation of a complete graph that depicts how data flows in the application program. The injected bytecode associates the tracking objects together by having each new tracking object, which represents a new location in the data flow, point to the previous tracking object in the dataflow, such as by having the flow tracking object point to the source tracking object.

In some cases, a single tracking object can have multiple parents, since multiple objects can propagate into a single object. For example, when multiple string objects are concatenated, the output is a single data object that has multiple parents, and each of these parents tracks the dataflow to the source in which the data object was introduced.

In block 112, bytecode is optionally injected to connect a flow tracking object with a copy of a data object. In embodiments, this can include the database system injecting bytecode to embed a flow tracking object in a copy of a tainted wrapper object, thereby enabling the tracking of the tainted wrapper object and the associated dataflow as the tainted wrapper object flows through the application program. Such a connection allows the injected bytecode to easily tie the tracking objects and their data flows together without having to create a separate out-of-band mechanism to do this. Additionally, as described below in reference to block 124, embedding a tracking object in a wrapper object leverages the garbage collector, such that when a wrapper object and its tracking object are subsequently deleted, the garbage collector removes the tracking object's associated data flow information as well.

In block 114, bytecode is injected to record information associated with a tracking event into a flow tracking object as the tracking event processes a copy of a data object. For example and without limitation, this can include the database system injecting bytecode to record information about the field assignment of the tainted wrapper object, and the line number 3 in the application program where the field was assigned to the previously untainted custom object, into the embedded flow tracking object. Injecting bytecode to record tracking information into a tracking object is covered in more detail above in reference to block 106.

In block 116, bytecode is optionally injected to create a copy of a second wrapper object for a second tracking event in an application program. By way of example and without limitation, this can include the database system injecting bytecode to create a wrapper object for the invocation of a method that uses the previously untainted custom object which had a field assigned using the tainted wrapper object. As mentioned before, injecting bytecode for a tracking event, such as a method invocation, a function call, or an assignment, requires such lengthy and detailed modifications to an application program that these detailed modifications are covered below, after the last block 132 of the method 100 and prior to references to FIG. 2. Creating a copy of the second wrapper object enables the injected bytecode to track different copies of the same wrapper object that take different paths in the application program. Although FIG. 1 describes an example of an application program that may include four tracking events (source, field assignment, method, and field retrieval for a sink), an application program may include fewer or a greater number of tracking events. Injecting bytecode to create a wrapper object is covered in more detail above in reference to block 108.

In block 118, bytecode is optionally injected to create a second flow tracking object for a second tracking event. In embodiments, this can include the database system injecting bytecode to create a flow tracking object for the method invocation using the previously untainted data object. Injecting bytecode to create a tracking object is covered in more detail above in reference to block 102. When the application program invokes a method, the injected bytecode may record an identifier of the method, the method arguments, and any instance object, into the flow tracking object, thereby enabling the injected bytecode to track wrapper objects for method invocations that use the wrapper objects as arguments. Similarly, the database system can record information for any other type of tracking event, such as field accesses, stores, array access, etc. As the tracking objects record information for tracking events, the injected bytecode associates the tracking objects together to enable the creation of a complete graph that depicts how data flows in the application program. The injected bytecode associates the tracking objects together by having each new tracking object, which represents a new location in the data flow, point to the previous tracking object in the dataflow. However, in this example the second tracking object does not point to the first tracking object because the second tracking object records information for the previously untainted custom object while the first tracking object records information for the tainted string "s," which is currently not directly related to the previously untainted custom object.

In block 120, bytecode is optionally injected to connect a second flow tracking object with a second wrapper object. For example and without limitation, this can include the database system injecting bytecode to embed the other flow tracking object in the copy of the wrapper object for the previously untainted custom object. Such a connection allows the injected bytecode to easily tie tracking objects and their data flows together without having to create a separate out-of-band mechanism to do this. Additionally, as described below in reference to block 124, embedding a tracking object in a wrapper object leverages the garbage collector, such that when a wrapper object and its tracking object are subsequently deleted, the garbage collector removes the tracking object's associated data flow information as well.

In block 122, bytecode is optionally injected to record information associated with a second tracking event into a second flow tracking object as the second tracking event processes a second wrapper object. By way of example and without limitation, this can include the database system injecting bytecode to record information about the invoked method, and the line number 4 in the application program where the method was invoked, into the embedded flow tracking object for the previously untainted custom object. Injecting bytecode to record tracking information into a tracking object is covered in more detail above in reference to block 106.

In block 124, bytecode is optionally injected to associate a flow tracking object with a second flow tracking object in response to a field retrieval of a copy of a wrapper object from a second wrapper object. In embodiments, this can include the database system injecting bytecode to respond to the field retrieval of the copy of the tainted wrapper object retrieved from the previously untainted custom object, by setting the "potential" pointer in the tracking object embedded in the copy of the tainted wrapper object to point to the tracking object embedded in the wrapper object for the previously untainted custom object.

The database system injects bytecode to change the field signature to be compatible, and then instrument the sensitive instructions inside of each function to make sure the functions are hooked to the runtime analysis unit at runtime. The injected bytecode replaces all of the types for fields with the wrapper type. For example, consider the following simple class.

```
public class SimpleClass {
private String sample;
}
```

In SimpleClass, the database system identifies a string field "sample". As for the "sample" field, the database system may have to inject bytecode to change its type from "String" to "Wrapper" so that a reference to that field may work correctly with the dataflow gathering code at runtime. Hence, the final outlook of the class may be something similar to the following.

```
public class SimpleClass {
private Wrapper sample;
}
```

There are cases the database system does not inject bytecode to replace the object with wrappers, and they include synthetic fields (due to interpreter restrictions), static final fields (due to interpreter restrictions), java.lang.Object fields (no need to change the type because wrapper is a subclass of object) and primitive fields (which are not considered to be tainted). In advanced approaches, primitive and its wrapper types can also contain taint that can have a security impact, such as an untrusted boolean coming from client is used to determine whether or not the client is an administrator.

When the database system determines which tracking objects will point to other tracking objects, the database system may also delete any out of scope tracking object when an application program lacks a subsequent reference to a wrapper object that embeds the out of scope tracking object. For example, this can include the injected bytecode deleting a flow tracking object when the application program lacks any subsequent references to the corresponding copy of the tainted wrapper object. In this instance, the garbage collector deletes a copy of the wrapper object because subsequent lines in the application program do not reference the copy of the wrapper object, which means that the copy of the wrapper object does not have any impact on the final vulnerability and the application program's dataflow. This enables the injected bytecode to prune the dataflow graph to remove the dataflow associated with the copy of the wrapper object as irrelevant.

In block 126, bytecode is injected to create a sink tracking object for outputting a copy of a data object to a data sink for an application program. For example and without limitation, this can include the database system injecting bytecode to respond to the execution of a field retrieval of the copy of the tainted wrapper object from the previously untainted data object and the printing the copy of the tainted wrapper object, by creating a sink tracking object for the printing of the copy of the tainted wrapper object. Although this example describes the application dataflow ending with a data sink, the application dataflow may end with any point of interest in the code. A data sink can be arbitrary defined as a point in the code based on whatever logic is required. Injecting bytecode to create a tracking object is covered in more detail above in reference to block 102.

In block 128, bytecode is optionally injected to connect a sink tracking object with a copy of a data object. By way of example and without limitation, this can include the database system injecting bytecode to embed the sink tracking object into the copy of the tainted wrapper object. Such a connection allows the injected bytecode to easily tie the tracking objects and their data flows together without having to create a separate out-of-band mechanism to do this. Additionally, as described above in reference to block 124, embedding a tracking object in a wrapper object leverages the garbage collector, such that when a wrapper object and its tracking object are subsequently deleted, the garbage collector removes the tracking object's associated data flow information as well.

In block 130, bytecode is injected to record information associated with a data sink into a sink tracking object. In embodiments, this can include the database system injecting bytecode to record information about the data sink, and the line number 5 in the application program where the printing occurred, into the sink tracking object. Injecting bytecode to record tracking information into a tracking object is covered in more detail above in reference to block 106.

In block 132, bytecode is injected to output a source tracking object, a first flow tracking object, and a sink tracking object as dynamic analysis of dataflow in an application program. For example and without limitation, this can include the database system injecting bytecode to output the source tracking object as a first node in a graph, the first flow tracking object as a second node in the graph, the associated second flow tracking object as a third node in the graph, and the sink tracking object as a fourth node in the graph, with the second node linked to the first node, the third node linked to the second node, and the fourth node linked to the third node to depict the dataflow sequence of the graph. By associating the second flow tracking object, which recorded information for the custom object, with the first flow tracking object, which recorded information for the object, the injected bytecode concatenates previously unrelated information to create a complete dataflow for the data. Each node in the graph represents a location in the flow of a wrapper object through the application program. As the wrapper objects flowed through the application program, the injected bytecode collected information and recorded the information in the tracking objects associated with these nodes. The collection of this information and nodes represents the data flow of a single wrapper object through the nodes being linked together to construct a graphic representation of the dataflow in the application program. The graph and its associated information depict not only the data source and the data sink, but also depict the dataflow through the application program, which enables the identification of any tracking event as an additional vulnerability.

Accordingly, systems and methods are provided which enable a database system to improve the performance, efficiency, and the ease of use of dynamic analysis of dataflow in application programs. The method 100 may be repeated as desired. Although this disclosure describes the blocks 102-132 executing in a particular order, the blocks 102-132 may be executed in a different order.

As mentioned above, injecting bytecode for a tracking event, such as a method invocation, a function call, or an assignment, requires such lengthy and detailed modifications to an application program that these detailed modifications are covered here, not above in reference to blocks 110 and 116. The database system adds two components, a bytecode instrumentation unit and a runtime analysis unit, to enable dynamic analysis of application program dataflow. The bytecode instrumentation unit is used to rewrite the bytecode statically to hook sensitive instructions and redirect them to the runtime analysis unit at runtime. Sensitive instructions include object instantiation, function invocation, field access and other instructions that might have influence on the dataflow. The runtime analysis unit is used in runtime to perform taint analysis, record tracking information and forward previously trapped sensitive instructions to the real receivers. However, the database system can also write the runtime analysis unit directly in bytecode and inject the runtime analysis unit into the existing program bytecode.

The database system injects bytecode into all of the .class and .jar files. The .class files consist of bytecode that may be interpreted by an interpreter. For example, there is special bytecode that handles method invocations, such as invokevirtual for invoking instance methods, invokestatic for invoking static methods, invokeinterface for invoking interface methods, and so on. When the bytecode instrumentation unit identifies invokevirtual, the injected bytecode redirects the method call to the runtime analysis unit which internally later calls back into the original target of the invokevirtual. The database system injects bytecode to change the method signature to be compatible, and then instrument the sensitive instructions inside of each function to make sure the functions are hooked to the runtime analysis unit at runtime.

In order to keep track of data points, arguments passed to a method and the return object are equipped with a wrapper to collect data points. In this case, the injected bytecode changes every method's object type to be the wrapper type. In general, methods are classified into two categories, constructors and regular methods. In the bytecode transformation, different approaches are used to transform their method signatures and possibly other definitions.

The injected bytecode transforms the wrapper version of the constructor as follows. The injected bytecode changes all argument types to be wrapper type, with the exceptions of the arguments of primitive, and java.lang.Object types. The injected bytecode appends the original argument types to the wrapper arguments. For example, suppose the database system has the following constructor.
public Example (String a, StringBuilder b);

After the bytecode transformation, the constructor may be transformed to be public Example (Wrapper w1, Wrapper w2, String a, StringBuilder b);

The first two arguments are the real arguments while the last two are dummy arguments added to provide method overloading and enforce type checking, such as via reflection. If the injected bytecode simply changes the types of the first two arguments, without appending the original dummy argument types, overloaded methods could end up having the same argument types because all object types are changed to be wrapper. Furthermore, since there are some cases where a method is invoked directly from an interpreter, and not from within user classes, the original method may be called instead of the transformed version. For example, the "public void main (String[ ] args)" method may be called by the interpreter as the program entry point, and the interpreter is not aware of the existence of the transformed version of the "main" method. In order to record data flows, the injected bytecode uses the transformed version of the constructor so that the subsequent sensitive instructions are trapped by the runtime analysis unit. In this case, instead of changing the constructor to be the transformed version, the injected bytecode creates a "constructor forwarder" that can forward the method call from the original constructor to the transformed version of the constructor if the original constructor is called directly. The "constructor forwarder" is actually the original constructor, which does nothing but call the transformed version of the constructor, which does the actual instantiation of the object.

The above example may be used to illustrate the case. After bytecode injection, the constructor of Example may look as follows.

```
@Constructor forwarder (uses original signature)
public Example (String a, StringBuilder b) {
this(new Wrapper(a), new Wrapper(b), a, b);
}
@Transformed constructor
public Example (Wrapper w1, Wrapper w2, String a, StringBuilder b) {
instantiate_object_with_arguments(w1, w2)
}
```

There is one exception in which there is no need to transform the constructor. If every argument is a primitive type or java.lang.Object, no transformation is needed because the types of the arguments will not be changed to wrapper. For example, public Example (Integer a, double b, Object c);

This constructor's argument types may not be changed, thus no constructor transformation is needed. Also, since no transformation is needed, the injected bytecode does not create a forwarder.

The injected bytecode takes the following steps to transform the method name and signature. The injected bytecode replaces all of the parameters to be wrapper with two exceptions, when the type of the parameter is primitive or java.lang.Object. The injected bytecode changes the method to static if it is not already, and pre-pends the wrapper of "this" to the method signature, to keep track of datapoints of "this" object. The injected bytecode appends the original signature to the method's name to provide method overloading. Overloaded methods may have different names even if they may have the same parameter types, such as wrappers. For example, suppose the database system processes the following method in class org.Example.
public void method1 (String a, Object b, int c);
  which has a method signature of
method 1 (java/lang/String;java/lang/Object;I)V
  which may be transformed to

```
method1SFDCCFDSorgExamplejavalangStringjavalangObjectIV
(Lorg/sfdc/runtimeanalysis/wrappers/Wrapper;Lorg/sfdc/
runtimeanalysis/wrappers/Wrapper;Ljava/lang/Object;I)V
``` whose source code representation is

```
public static void
method1SFDCorgExamplejavalangStringjavalangObjectIV(Wrapper e,
Wrapper a, Object b, int c);
```

The injected bytecode changes the method name to provide method overloading. Otherwise methods like the following two would be transformed to the same method.
public void method1 (String a, Object b, int c);
public void method1 (StringBuilder a, Object b, int c);

The injected bytecode changes the virtual methods to static methods to keep data flows associated with the instance object. The injected bytecode keeps the instance object to be wrapper type in order to record data points. However, if the instance object is of wrapper type, the invocation of "method1" of the instance object will not be successful until the wrapper is stripped from the instance object because the interpreter only allows a virtual method of a class to be invoked on an object of that class.

In addition, the injected bytecode inserts a dummy word "SFDCCDFS" between the original method name and the pre-pended method signature in order to prevent the new method name from accidentally conflicting with an existing method name. The injected bytecode creates a method forwarder for each method, like the injected bytecode did for object constructors, to make sure that the transformed methods are able to handle direct calls from the interpreter. For example, in addition to the transformed method above, the injected bytecode may also create a forwarder method with the original name and signature:

```
public void method1(String a, Object b, int c) {
    method1SFDCCFDSorgExamplejavalangStringjavalangObjectIV
    (new Wrapper(this), new Wrapper (a), b, c);
}
```

The injected bytecode manually enforces type by checking the type of "element" in each wrapper and making sure it conforms to the original type of the object. The injected bytecode does not change the signature of a method for two exceptions. If a method is "<clinit>" (static initialization of the class), there is no argument to it and the name of it cannot be changed, otherwise the interpreter may throw a "VerifyError" exception. If a method is abstract, it is intuitive since abstract methods do not have concrete implementations in the current class, so their method signature may not be changed.

After the injected bytecodes changes the method signatures, the injected bytecode transforms the actual code (instructions) inside of each method. Since each instruction is interpreted differently, and may be forwarded to different runtime analysis unit methods, but the exact details of how each instruction is transformed are not necessary to not covered here, as they would be obvious to one of ordinary skill in the art.

The injected bytecode uses one generic wrapper to handle all of the instructions originating from different methods from different classes by using a generic instruction forwarding mechanism. Regardless of a method's name, number of arguments, type of arguments, existence and type of return value, etc., they will all be forwarded generically to the single method in the runtime analysis unit. For a simple example, a method in runtime analysis unit may be like the following.
public static final Object handleInvokevirtual (Object . . . args);

The injected bytecode forwards the following two method invocations to the method above:
call "static String funcA (String a, int b, Object c)"
call "void funcB (StringBuffer a)"

Since some interpreters use a stack to pass arguments to the method, there may be three arguments listed on the stack before calling funcA. The database system identifies "handleInvokevirtual" as accepting any number of arguments. So the database system needs to determine how many arguments on the stack it should accept without tampering with the elements stored after those legitimate arguments. The database system solves this problem by injecting bytecode to manually craft an array similar to how vararg is implemented in Java. In Java, a vararg argument is equivalent to an object array which contains all of the objects specified for the vararg. Hence, when the database system injects bytecode to transform the method invocation instructions, the injected bytecode effectively creates an object array, stores the arguments in it, and adds it to the stack. At runtime, handleInvokevirtual may pop one array object off the stack and process the arguments from it before passing them on to the final target method. Since primitive types are not objects, arguments of those types may be wrapped before storing into the array using the corresponding "valueOf" method.

The injected bytecode handles the return value in a generic method when the target function sometimes has a return value and sometimes does not have a return value. At transformation time, the injected bytecode detects if the real target method is expected to return any value based on the method signature. If the original method does not have a return value, the database system injects bytecode that at runtime may pop the generically returned object (from the handleInvokevirtual) off the stack. Otherwise, if the method does have a return value, the injected bytecode casts it to the type it is expecting, or strips the primitive type wrapper to pure primitive type if it is expecting a primitive value, and keeps it on the stack to be consumed by the calling method.

To summarize, if the database system wants to forward "funcA" to "handleInvokevirtual", the database system injects bytecode to create an array of three elements, convert any argument of primitive type to object representation (such as int to Integer), and store each argument into the array. The database system also injects bytecode that can cast the return value from handleInvokevirtual from object to wrapper. The database system can inject bytecode to create the array for the arguments, just like the database system did for funcA. However, the database system injects bytecode to pop off the returned value from handleInvokevirtual.

After the runtime analysis unit receives every sensitive instruction, the runtime analysis unit analyzes the instruction and follows proper steps to record the dataflow point. Then the runtime analysis unit executes the instruction on the original caller's behalf using reflection, followed by another round of dataflow recording on the return value. The database system leverages Java reflection to make the runtime analysis unit generic, meaning that it can dispatch method calls regardless of its class name, method name, method signature, arguments and so forth. The database system has a single method entry point for each specific call type, such as handleVirtualCall for invokevirtual. In addition, having a single generic interface is important, because otherwise the database system has to inject bytecode to create individual entry points for each specific method with different argument requirements.

System classes refer to classes that are not modified by the bytecode instrumentation unit, and the sensitive instructions inside those classes will not be trapped by the runtime analysis unit. In this case, the injected bytecode needs rules for the system classes so that the injected bytecode knows what to record on entering and exiting methods of those classes. Rules are defined as data source rules, data sink rules, taint propagation rules, taint sanitization rules, etc. For example, if a method is defined to have a data source rule, some of its arguments or its return value may be tainted upon function returns. If a method is defined to have a taint propagation rule, the taint from one of more of its parameters may be propagated to its other parameters or the return value. With all these rules defined, the injected bytecode can assign proper taint labels to the method's parameters and its return value.

Non-system classes, on the other hand, are classes that are instrumented by the bytecode instrumentation unit. Hence, any sensitive instruction may be captured by the runtime analysis unit which is completely transparent to it. Also, before calling into a system class, the injected bytecode has to unwrap the wrappers from every argument because system classes are not instrumented and do not expect any wrapper type at all. Currently, all of the Java Development Kit methods, such as methods starting with Java, java.x, etc., are classified into system classes, and rules are needed to monitor the behavior of their methods. An alternative method would be to instrument the whole non-native methods in the Java Development Kit as well, which reduces the number of rules but increase the latency because Java Development Kit methods are also performing dataflow analysis with the logic. It also could increase the complexity of parsing the final dataflow because a lot of the datapoints are in library classes, which the developers should not be concerned with.

Figure 2:
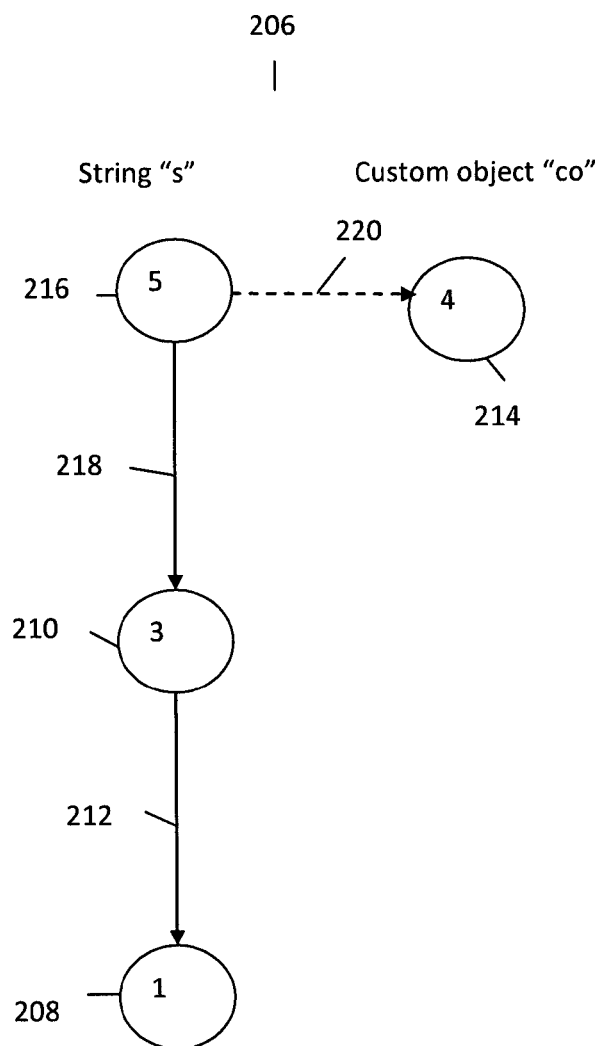
FIG. 2 is a block diagram of a portion of example application code and its associated dataflow graph for a dynamic analysis bytecode injection for application dataflow.

FIG. 2 is a block diagram of a portion of example application code and its associated dataflow graph for dynamic analysis bytecode injection for application dataflow in an embodiment. The block includes a portion of example application code 200, which includes an application code column 202 and a code line number column 204. The block diagram of a portion of example application code and its associated dataflow graph includes also includes a dataflow graph 206.

In the portion of example application code 202, an application program gets a tainted string "s" from the request in line 1, creates a custom object "co" in line 2, assigns the tainted string "s" to a field "x" in the previously untainted custom object "co" in line 3, calls a function "f1" with the previously untainted custom object "co" in line 4, and retrieves the field "x" from the previously untainted custom object "co" for printing in line 5. The database system injects bytecode to create new tracking objects during the tracking events, which are getting the parameter "s," assigning the string "s" to the field "x" of the previously untainted custom object "co," calling the function "f1," and printing the field "x," with previously created tracking objects for a specific data object becoming the parents of subsequently created tracking objects for the specific data object. The taint information is stored in a hierarchical way, in which the dataflow is represented by chaining a series of tracking objects that were created along the tracking events through which that the tainted wrapper object flows.

The dataflow graph 206 may evolve based on the following steps. When the application program gets the tainted string "s" from the request in line 1, the injected bytecode creates a tracking object 1 208 to record information about getting the tainted sting "s." After the application program assigns the tainted string "s" to the field "x" of the previously untainted custom object "co" in line 3, the injected bytecode creates a tracking object 3 210 to record information about the field assignment, and points the tracking object 3 210 to the tracking object 1 208 via the pointer 212. When the application program calls the function "f1" in line 4, the injected bytecode creates a tracking object 4 214, but does not point the tracking object 4 214 to the tracking object 3 210 because the tracking object 4 214 records information for the previously untainted custom object "co," whereas the tracking object 3 210 records information for the tainted string "s." When the application program retrieves and prints the field "x" in line 5, the injected bytecode creates a tracking object 5 216 to record information about the data sink, and points the tracking object 5 216 to the tracking object 3 210 via a pointer 218. Based on the preceding, the injected bytecode may indicate that the detected dataflow is {1, 3, 5}.

However, this is incorrect because the ideal dataflow graph for the portion of example application code 202 is {1, 3, 4, 5}. This ideal dataflow indicates where the tainted data was introduced in line 1, how the tainted data flowed in the application program, such as being assigned to a field "x" of the previously untainted custom object "co" in line 3, and eventually reached the data sink in line 5. The injected bytecode should also indicate any relevant events, such as calling the function "f1" with the previously untainted custom object "co" in line 4, which may impact on the final vulnerability and its dataflow.

In order to correct the dataflow {1, 3, 5}, the injected bytecode adds the tracking object 4 214, which enables the reporting of the corresponding node as part of the dataflow graph 206. The reason is that the tracking object 4 214 records information related to the previously untainted custom object "co," which initially does not appear to be related to the information recorded for the custom string "s." Since the injected bytecode already records information for the tainted string "s" and the previously untainted custom object "co," the injected bytecode concatenates the taint propagation of the string "s" with that of the previously untainted custom object "co" so that when the tainted data reaches a data sink, the injected bytecode outputs the complete dataflow {1, 3, 4, 5}. The injected bytecode identifies a field retrieval as the operation that indicates when the potential dataflow for the previously untainted custom object "co" is concatenated with the dataflow for the tainted string "s." Therefore, when the application program retrieves the tainted string "s" from the field "x" of the previously untainted custom object "co" for printing in line 5, the injected bytecode adds the "potential" pointer 220 to point from the tracking object 5 216 to the most recent tracking object for the previously untainted custom object "co," which is the tracking object 4 214 in this example. Hence, when the application program reaches the data sink in line 5, the injected bytecode bases the dataflow 206 on the lines {1, 3, 4, 5}, which is reported as the vulnerability path because the tainted string "s" may not have been sanitized during the function call in line 4. The injected bytecode enables adding the taint information from all tracking objects, even the tracking objects which do not initially appear to be directly related to the tainted data. Whenever a wrapper object reaches a data sink, the injected bytecode may climb up the tracking object tree associated with the data sink to determine if the associated dataflow represents a vulnerability.

Although the application code 200 and the dataflow graph 206 depict simplified examples of dynamic analysis tracking object associations for application program dataflow, the code 200 and the graph 206 may depict more complex dataflows. For example, if the code 200 included multiple function calls using the previously untainted custom object "co," the graph 206 would include multiple linked nodes depicting the dataflow for the previously untainted custom object "co," with the potential" pointer 220 pointing to the tracking object that records information for the most recently called function.

In another example, the application program may get another tainted string "y" and assign the tainted string "y" as another field of the previously untainted custom object "co," such that the injected bytecode creates a linked node sequences for the tainted string "s," creates a linked node sequences for the tainted string "y," and creates a linked node sequences for the previously untainted custom object "co." In this example, the injected bytecode creates one "potential" pointer pointing from the node for the data sink for the string "s" to the most recent node for the previously untainted custom object "co" before the application program reached the data sink for the string "s," and another "potential" pointer pointing from the node for the data sink for the string "y" to the most recent node for the previously untainted custom object "co" before the application program reached the data sink for the string "y." In yet another example, the code 200 may include nested objects, where the tainted string "s" is embedded deeply into other previously untainted objects, and the graph 206 reflects such deep embedding accordingly.

The injected bytecode provides the graph 206 by concatenating the complete dataflow of a tainted object and the complete data flow of a previously untainted object that receives a field assignment of the tainted object, thereby providing a system user with sufficient information about the creation of the previously untainted object, when the tainted object was retrieved, when the tainted object was assigned as a field of the previously untainted object, and how the tainted object flows within the previously untainted object. In case the information about the previously untainted object prior to the field assignment of the tainted object is not needed for analysis of vulnerabilities, the injected bytecode may add a "taint assignment" field to the tracking object, or node object, to record when the tainted object was assigned as a field of the previously untainted object. Using the "taint assignment" field, the injected bytecode may remove the nodes from the graph 206 that correspond to information recorded prior to the taint assignment, thereby making the graph 206 more concise.

System Overview

Figure 3:
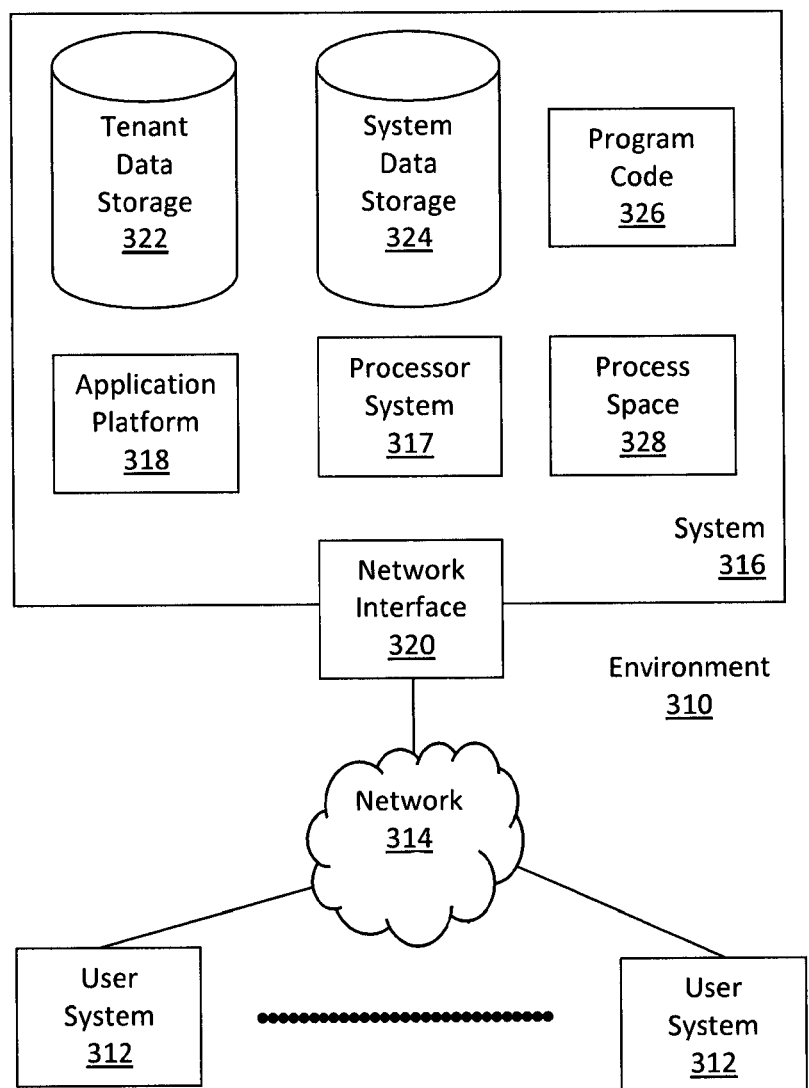
FIG. 3 illustrates a block diagram of an example of an environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
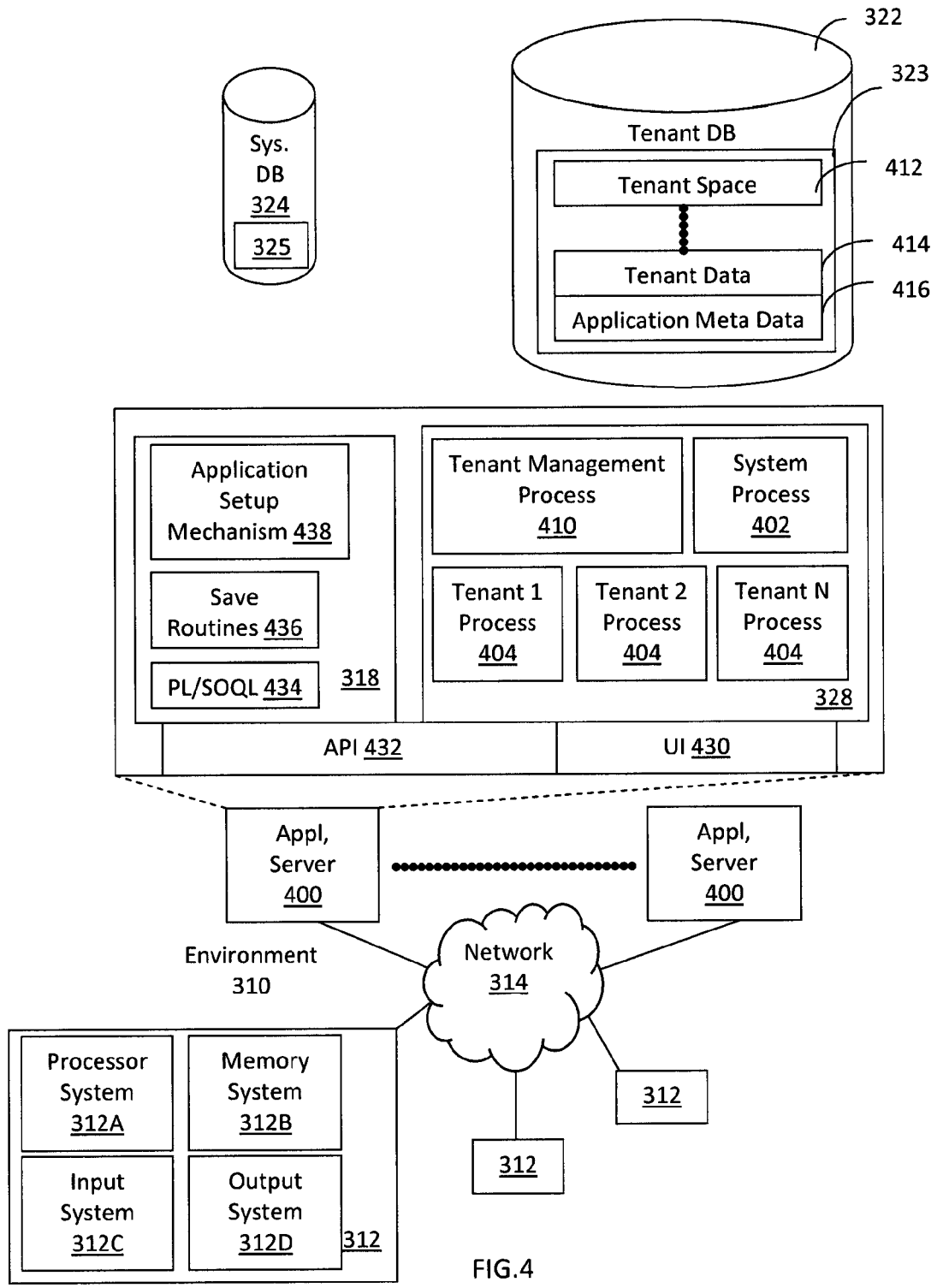
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D.

FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 34 that provides a programming language style interface extension to API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus for dynamic analysis bytecode injection for application dataflow, the apparatus comprising:
   a processor; and
   one or more stored sequences of instructions which, when executed by the processor, cause the processor to carry out the steps of:
      injecting bytecode to create a source tracking object for a data object received from a data source;
      injecting bytecode to record information associated with the data source into the source tracking object;
      injecting bytecode to create a copy of the data object for a tracking event in an application program;
      injecting bytecode to create a flow tracking object for the tracking event;
      injecting bytecode to record information associated with the tracking event into the flow tracking object as the tracking event processes the copy of the data object;
      injecting bytecode to create a sink tracking object for outputting the copy of the data object to a data sink;
      injecting bytecode to record information associated with the data sink into the sink tracking object; and
      injecting bytecode to output the source tracking object, the flow tracking object, and the sink tracking object as dynamic analysis of dataflow in the application program.

2. The apparatus of claim 1, wherein the tracking event comprises one of a method invocation, an assignment, and a field assignment of the copy of the wrapper object to a field of another wrapper object.

3. The apparatus of claim 1, wherein the steps further comprise:
   injecting bytecode to replace the data object with a wrapper object that points to the data object;
   injecting bytecode to create a second wrapper object for a second tracking event in the application program;
   injecting bytecode to create a second flow tracking object for the second tracking event;
   injecting bytecode to record information associated with the second tracking event into the second flow tracking object as the second tracking event processes the second wrapper object;
   injecting bytecode to associate the flow tracking object with the second flow tracking object in response to a field retrieval of the copy of the wrapper object from the second wrapper object; and
   injecting bytecode to output the associated second flow tracking object as dynamic analysis of dataflow in the application program.

4. The apparatus of claim 3, wherein the steps further comprise:
   injecting bytecode to connect the source tracking object with the wrapper object;
   injecting bytecode to connect the flow tracking object with the copy of the wrapper object;
   injecting bytecode to connect the second flow tracking object with the second wrapper object; and
   injecting bytecode to connect the sink tracking object with the copy of the wrapper object.

5. The apparatus of claim 4, wherein injecting bytecode to output the source tracking object, the flow tracking object, and the sink tracking object comprises injecting bytecode to output the source tracking object as a first node in a graph, the flow tracking object as a second node in the graph, the associated second flow tracking object as a third node in the graph, and the sink tracking object as a fourth node in the graph, wherein the second node is linked to the first node, the third node is linked to the second node, and the fourth node is linked to the third node to depict the dataflow sequence of the graph.

6. A non-transitory machine-readable medium carrying one or more sequences of instructions dynamic analysis bytecode injection for application dataflow, which instructions, when executed by one or more processors, cause the one or more processors to carry out the steps of:

injecting bytecode to create a source tracking object for a data object received from a data source;

injecting bytecode to record information associated with the data source into the source tracking object;

injecting bytecode to create a copy of the data object for a tracking event in an application program;

injecting bytecode to create a flow tracking object for the tracking event;

injecting bytecode to record information associated with the tracking event into the flow tracking object as the tracking event processes the copy of the data object;

injecting bytecode to create a sink tracking object for outputting the copy of the data object to a data sink;

injecting bytecode to record information associated with the data sink into the sink tracking object; and injecting bytecode to output the source tracking object, the flow tracking object, and the sink tracking object as dynamic analysis of dataflow in the application program.

7. The non-transitory machine-readable medium of claim 6, wherein the tracking event comprises one of a method invocation, an assignment, and a field assignment of the copy of the wrapper object to a field of another wrapper object.

8. The non-transitory machine-readable medium of claim 6, wherein the steps further comprise:

injecting bytecode to replace the data object with a wrapper object that points to the data object;

injecting bytecode to create a second wrapper object for a second tracking event in the application program;

injecting bytecode to create a second flow tracking object for the second tracking event;

injecting bytecode to record information associated with the second tracking event into the second flow tracking object as the second tracking event processes the second wrapper object;

injecting bytecode to associate the flow tracking object with the second flow tracking object in response to a field retrieval of the copy of the wrapper object from the second wrapper object; and injecting bytecode to output the associated second flow tracking object as dynamic analysis of dataflow in the application program.

9. The non-transitory machine-readable medium of claim 8, wherein the steps further comprise:

injecting bytecode to connect the source tracking object with the wrapper object;

injecting bytecode to connect the flow tracking object with the copy of the first wrapper object;

injecting bytecode to connect the second flow tracking object with the second wrapper object; and injecting bytecode to connect the sink tracking object with the copy of the wrapper object.

10. The non-transitory machine-readable medium of claim 9, wherein injecting bytecode to output the source tracking object, the flow tracking object, and the sink tracking object comprises injecting bytecode to output the sink tracking object as a first node in a graph, the flow tracking object as a second node in the graph, the associated second flow tracking object as a third node in the graph, and the sink tracking object as a fourth node in the graph, wherein the second node is linked to the first node, the third node is linked to the second node, and the fourth node is linked to the third node to depict the dataflow sequence of the graph.

11. A method for dynamic analysis bytecode injection for application dataflow, the method comprising:

injecting bytecode, by a computing system having at least one processor, to create a source tracking object for a data object received from a data source;

injecting bytecode, by the computing system, to record information associated with the data source into the source tracking object;

injecting bytecode, by the computing system, to create a copy of the data object for a tracking event in an application program;

injecting bytecode, by the computing system, to create a flow tracking object for the tracking event;

injecting bytecode, by the computing system, to record information associated with the tracking event into the flow tracking object as the tracking event processes the copy of the data object;

injecting bytecode, by the computing system, to create a sink tracking object for outputting the copy of the data object to a data sink;

injecting bytecode, by the computing system, to record information associated with the data sink into the sink tracking object; and injecting bytecode, by the computing system, to output the source tracking object, the flow tracking object, and the sink tracking object as dynamic analysis of dataflow in the application program.

12. The method of claim 11, wherein the tracking event comprises one of a method invocation, an assignment, and a field assignment of the copy of the wrapper object to a field of another wrapper object.

13. The method of claim 11, wherein the method further comprises:

injecting bytecode, by the computing system, to replace the data object with a wrapper object that points to the data object;

injecting bytecode, by the computing system, to create a second wrapper object for a second tracking event in the application program;

injecting bytecode, by the computing system, to create a second flow tracking object for the second tracking event;

injecting bytecode, by the computing system, to record information associated with the second tracking event into the second flow tracking object as the second tracking event processes the second wrapper object;

injecting bytecode, by the computing system, to associate the flow tracking object with the second flow tracking object in response to a field retrieval of the copy of the wrapper object from the second wrapper object; and injecting bytecode, by the computing system, to output the associated second flow tracking object as dynamic analysis of dataflow in the application program.

14. The method of claim 13, wherein the method further comprises:

injecting bytecode, by the computing system, to connect the source tracking object with the wrapper object;

injecting bytecode, by the computing system, to connect the flow tracking object with the copy of the first wrapper object;

injecting bytecode, by the computing system, to connect the second flow tracking object with the second wrapper object; and injecting bytecode, by the computing system, to connect the sink tracking object with the copy of the wrapper object.

15. The method of claim 14, wherein injecting bytecode, by the computing system, to output the source tracking object, the flow tracking object, and the sink tracking object comprises injecting bytecode, by the computing system, to output the source tracking object as a first node in a graph, the flow tracking object as a second node in the graph, the associated second flow tracking object as a third node in the graph, and the sink tracking object as a fourth node in the graph, wherein the second node is linked to the first node, the third node is linked to the second node, and the fourth node is linked to the third node to depict the dataflow sequence of the graph.

16. A computer program product comprising a non-transitory computer-readable medium storing computer-readable program code to be executed by one or more processors when retrieved from the non-transitory computer-readable medium, the program code including instructions to:
    inject bytecode to create a source tracking object for a data object received from a data source;
    inject bytecode to record information associated with the data source into the source tracking object;
    inject bytecode to create a copy of the data object for a tracking event in an application program;
    inject bytecode to create a flow tracking object for the tracking event;
    to inject bytecode to record information associated with the tracking event into the flow tracking object as the tracking event processes the copy of the data object;
    inject bytecode to create a sink tracking object for outputting the copy of the data object to a data sink;
    inject bytecode to record information associated with the data sink into the sink tracking object; and
    inject bytecode to output the source tracking object, the flow tracking object, and the sink tracking object as dynamic analysis of dataflow in the application program.

17. The computer program product of claim 16, wherein the tracking event comprises one of a method invocation, an assignment, and a field assignment of the copy of the wrapper object to a field of another wrapper object.

18. The computer program product of claim 16, wherein the program code includes further instructions to:
    inject bytecode to replace the data object with a wrapper object that points to the data object;
    inject bytecode to create a second wrapper object for a second tracking event in the application program;
    inject bytecode to create a second flow tracking object for the second tracking event;
    transmitting code, by the at least one computer processor, to inject bytecode to record information associated with the second tracking event into the second flow tracking object as the second tracking event processes the second wrapper object;
    inject bytecode to associate the flow tracking object with the second flow tracking object in response to a field retrieval of the copy of the wrapper object from the second wrapper object; and
    inject bytecode to output the associated second flow tracking object as dynamic analysis of dataflow in the application program.

19. The computer program product of claim 18, wherein the program code includes further instructions to:
    transmitting code, by the at least one computer processor, to inject bytecode to connect the source tracking object with the wrapper object;
    transmitting code, by the at least one computer processor, to inject bytecode to connect the flow tracking object with the copy of the wrapper object;
    transmitting code, by the at least one computer processor, to inject bytecode to connect the second flow tracking object with the second wrapper object; and
    transmitting code, by the at least one computer processor, to inject bytecode to connect the sink tracking object with the copy of the wrapper object.

20. The computer program product of claim 19, wherein injecting bytecode to output the source tracking object, the flow tracking object, and the sink tracking object comprises injecting bytecode to output the sink tracking object as a first node in a graph, the flow tracking object as a second node in the graph, the associated second flow tracking object as a third node in the graph, and the sink tracking object as a fourth node in the graph, wherein the second node is linked to the first node, the third node is linked to the second node, and the fourth node is linked to the third node to depict the dataflow sequence of the graph.

* * * * *